W. A. HORRALL & J. J. VERCKLER.
Seed-Sower.
No. 205,090.  Patented June 18, 1878.
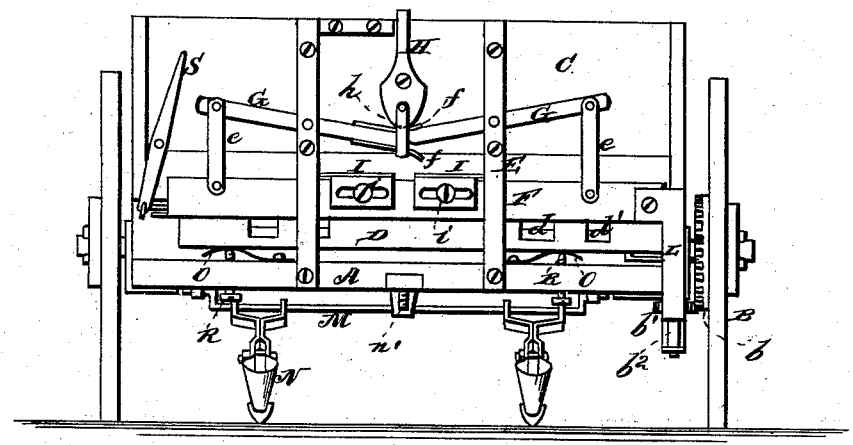
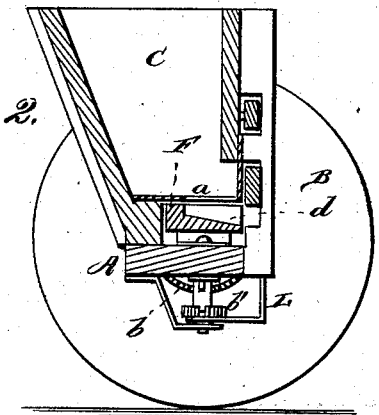
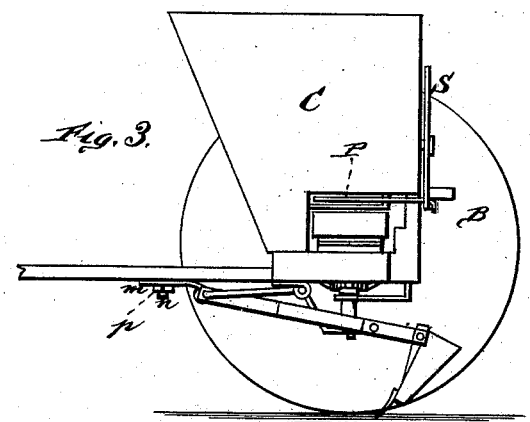
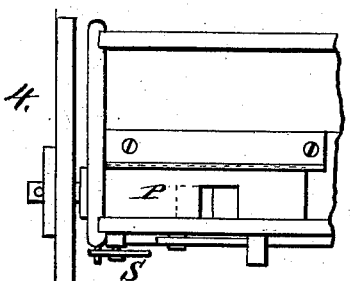
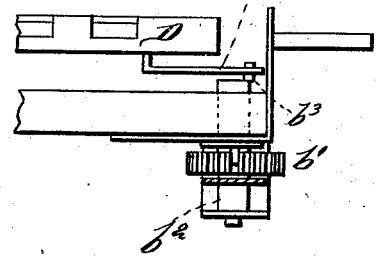
WITNESSES  INVENTORS.

UNITED STATES PATENT OFFICE.

WILLIAM A. HORRALL AND JOSEPH J. VERCKLER, OF CHICO, CALIFORNIA.

IMPROVEMENT IN SEED-SOWERS.

Specification forming part of Letters Patent No. 205,090, dated June 18, 1878; application filed April 6, 1878.

*To all whom it may concern:*

Be it known that we, WILLIAM A. HORRALL and JOSEPH J. VERCKLER, of Chico, in the county of Butler and State of California, have invented a new and valuable Improvement in Seed-Sowers; and we do hereby declare that the following is a full, clear, and exact description of the construction and operation of the same, reference being had to the annexed drawings, making a part of this specification, and to the letters and figures of reference marked thereon.

Figure 1 of the drawings is a rear view of our seed-sower. Fig. 2 is a sectional detail; and Figs. 3, 4, and 5 are detail views thereof.

The nature of our invention consists in the construction and arrangement of a broadcast seed sower or drill, as will be hereinafter more fully set forth.

The annexed drawings, to which reference is made, fully illustrate our invention.

A represents the axle, provided at each end with a suitable spindle-arm to receive the driving-wheel B. On top of the axle is the seed-hopper C, having two sets of holes in its bottom, one for wheat and the other for barley or other similar grain.

Below the bottom of the hopper C, and bearing against the same, is a vibrating bar, D, having corresponding holes or sets of holes $d$ $d'$, said holes passing from the top through the rear of the bar, and the grain falls into the same, and is forced out to the rear of the machine by the rapid vibrations that are given to the bar by the gear-wheels $b$ $b^1$, and the grain scattered evenly over the ground as the machine moves forward. The gear-wheel $b$ is secured on the inner side of one of the driving-wheels B, and the gear-wheel $b^1$ is feathered on an upright shaft, $b^2$, so as to be movable up and down thereon. The upper end of the shaft $b^2$ is formed or provided with a crank, $b^3$, which is, by a pitman, $b^4$, connected with the vibrating bar D.

F represents the cut-off bar, movable vertically in guides E, and connected by links $e$ $e$ with the outer ends of two pivoted levers, G G, the inner ends of which are connected by means of overlapping plates $f f$, and operated by means of a central cam-lever, H, and stirrup $h$. By these means the cut-off bar F can be raised and lowered as desired, and also regulate the amount of grain to be sown. To the cut-off bar are attached spring-gages I I, fastened by set-screws $i$ $i$ for this purpose.

When the gages I are properly adjusted, so that the spring-arm thereof registers with the slots in the vertical guide-bars E, the elastic pressure of spring-gage will have a tendency to keep down the cut-off bar F and regulate the feed through the openings $d$ $d'$.

The compound lever that raises and lowers the cut-off bar at the same time throws the gear-wheels in and out of gear by means of an arm, L, secured to one end of the cut-off bar, and having its lower end projecting under and forming a support for the gear-wheel $b^1$ on the shaft $b^2$.

When the bar F is lowered, the arm L is lowered with it, and the wheel $b^1$ drops out of place; and as soon as the bar F is raised again, the arm L throws the wheel $b^1$ in gear.

The vibrating bar D is supported upon metallic springs O O, under which are arranged temper-screws R R, by which means the bar can be raised or lowered, as may be required.

P represents a slide, operated by a lever, S, and arranged to close one-half of the openings in the box C, when necessary.

To the under side of the axle A is hinged a stirrup or bail, M, which extends forward, and is held to the tongue by a clip, $m$, bolt $n$, and nut $p$, as shown. On this bail are hinged the cultivators N, which follow in rear of the machine, and are provided with spouts to catch the grain as it falls from the vibrating bar, and convey it into the furrows behind the cultivators and drill the grain.

To change to broadcast it is only necessary to unscrew the nut $p$, take off the clip $m$ from the bolt $n$, and throw the bail M backward and fasten to a bolt, $n'$, and then the cultivators follow and cover the grain as it is sown broadcast.

What we claim as new, and desire to secure by Letters Patent, is—

1. The combination of the seed-box C, vibrating bar D, and vertically-operating cut-off bar F, with gages I I, as and for the purposes set forth.

2. The combination of the cut-off bar F, guides E, links $e$, levers G G, with overlapping plates $f$, and the cam-lever H, with stirrup $h$, all substantially as and for the purposes set forth.

3. The combination of the cut-off bar F, arm L, gear-wheel $b^1$, shaft $b^2$, with crank $b^3$ and pitman $b^4$, vibrating bar D, and the gear-wheel $b$, all operating in the manner described, and for the purposes set forth.

4. The springs O and regulating-screws R, in combination with the vibrating bar D, for the purposes set forth.

5. The combination, with the seed-sower, of the hinged bail M, cultivators N, clip $m$, bolts $n\ n'$, and nut $p$, substantially as and for the purposes set forth.

In testimony that we claim the above we have hereunto subscribed our names in the presence of two witnesses.

WILLIAM A. HORRALL.
JOSEPH J. VERCKLER.

Witnesses:
ANDREWS HALLER,
A. J. LUCAS.